Aug. 29, 1950  W. BEGEROW  2,520,193
VALVE CONTROL SYSTEM FOR SCARFING MACHINES
Filed April 27, 1946  2 Sheets-Sheet 2

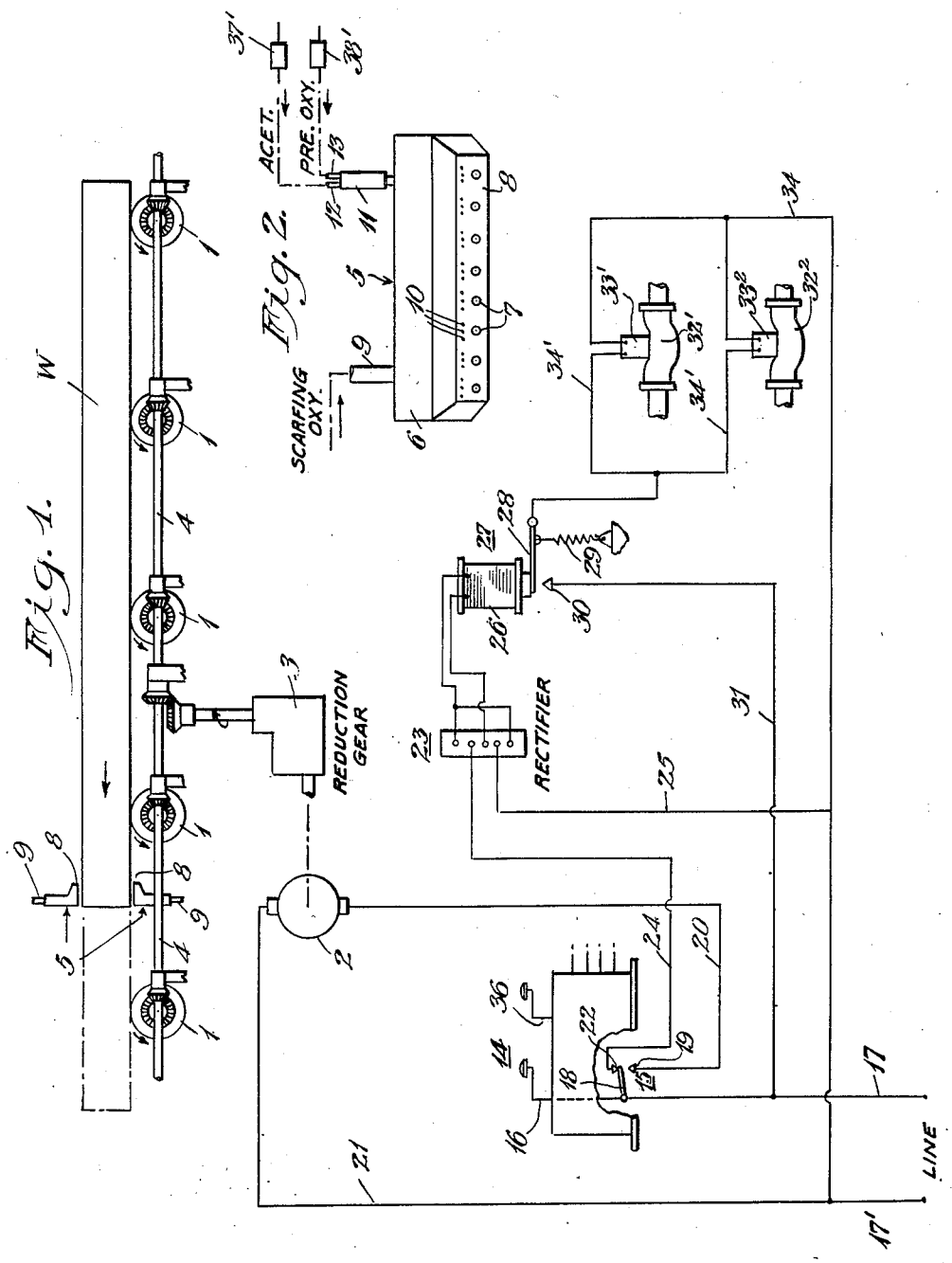

INVENTOR
Walter Begerow
BY
ATTORNEYS

Patented Aug. 29, 1950

2,520,193

UNITED STATES PATENT OFFICE 2,520,193

VALVE CONTROL SYSTEM FOR SCARFING MACHINES

Walter Begerow, Wood-Ridge, N. J., assignor to Air Reduction Company, Incorporated, a corporation of New York Application April 27, 1946, Serial No. 665,361

5 Claims. (Cl. 266—23)

This invention relates to improvements in scarfing machines, i. e. machines for removing surface metal from billets, blooms, ingots, and the like, by projecting a row of oxygen jets against the surface of the work at an angle to the surface while the surface metal is at kindling temperature and while the work-piece is moving relative to the oxygen jets to thereby progressively remove the surface metal by thermochemical action. More particularly, the invention relates to an improved control system for the gas valves of such a scarfing machine.

When scarfing billets and other heavy workpieces supported on feed rolls, such as the motor-driven feed rolls of a mill table, it is usually not possible to obtain rapid acceleration of the workpiece when its movement under the tips of the scarfing torches is begun, due to the inertia of the work-piece and the limited friction of the feed rolls against the work-piece. Therefore, it is not desirable to turn on the supply of scarfing oxygen to the scarfing torches as soon as the motor which operates the feed rolls is started, but to delay turning it on long enough after the motor is energized to permit the work-piece to start moving. Before movement of the work-piece past the tips of the scarfing torches is started, and before the scarfing oxygen is turned on, the work-piece is moved up to the torch tips and allowed to remain stationary in this position until the preheating flames of the tips heat the surface metal to kindling temperature as is well understood in the art. When the preheating gases, usually oxygen and a fuel-gas such as acetylene, are turned on at the beginning of the preheating period, it is desirable to delay turning on the preheating oxygen long enough after the fuel-gas is turned on and ignited to avoid the danger of a flashback. Similarly, when turning off the preheating gases it is desirable to delay turning off the fuel-gas long enough after the oxygen is turned off to avoid the danger of a flashback.

One object of the invention is to provide an electrical valve control system for scarfing machines by which the preheating gases, upon manual operation of a switch at a control station through its successive positions, can be turned on or off in proper timed sequence to avoid the danger of flashbacks, and which, in the event of too rapid manual operation of the control switch, will automatically cause sufficient delay in the turning on of the preheating oxygen after the fuel-gas is turned on and sufficient delay in the turning off of the fuel-gas after the preheating oxygen is turned off to avoid the danger of flashbacks.

Another object is to provide an electrical valve control system for scarfing machines, which upon manual operation of a switch at the control station, will cause the scarfing oxygen to be turned on when the feed roll motor is energized but will automatically delay the turning on of the scarfing oxygen long enough after the motor is energized to permit the work-piece to start moving.

According to the invention the scarfing oxygen valves and the valves for the preheating gases are controlled by two switches at a control station. Operation of one of the switches through its successive positions causes the preheating fuel-gas valves to open first to thereby turn on the fuel-gas for the preheating flames, and then causes the preheating oxygen valves to open, a time delay relay being provided to prevent opening of the preheating oxygen valves too soon after the opening of the fuel-gas valves if the switch at the control station is moved through its successive positions too rapidly. Another time delay relay prevents closing of the fuel-gas valves too soon after closing of the preheating oxygen valves if the control switch is moved too rapidly through its successive positions in the reverse direction to shut off the supply of preheating gases. Actuation of the second switch at the control stations closes a circuit to the motor which operates the feed rolls on which the work-piece is supported and also opens the scarfing oxygen valves, but a time delay relay is provided which functions when the motor control switch is moved to its motor-starting position to delay opening of the scarfing oxygen valves for a sufficient period of time after the motor is energized to delay turning on the scarfing oxygen until the inertia of the work-piece has been overcome and the movement of the work-piece has been started by the feed rolls.

The invention is illustrated in the accompanying drawings in which:

Figure 1 is a diagrammatic representation of part of the improved valve control system;

Fig. 2 is a front elevation of one of the torch tips; and

Figure 3:
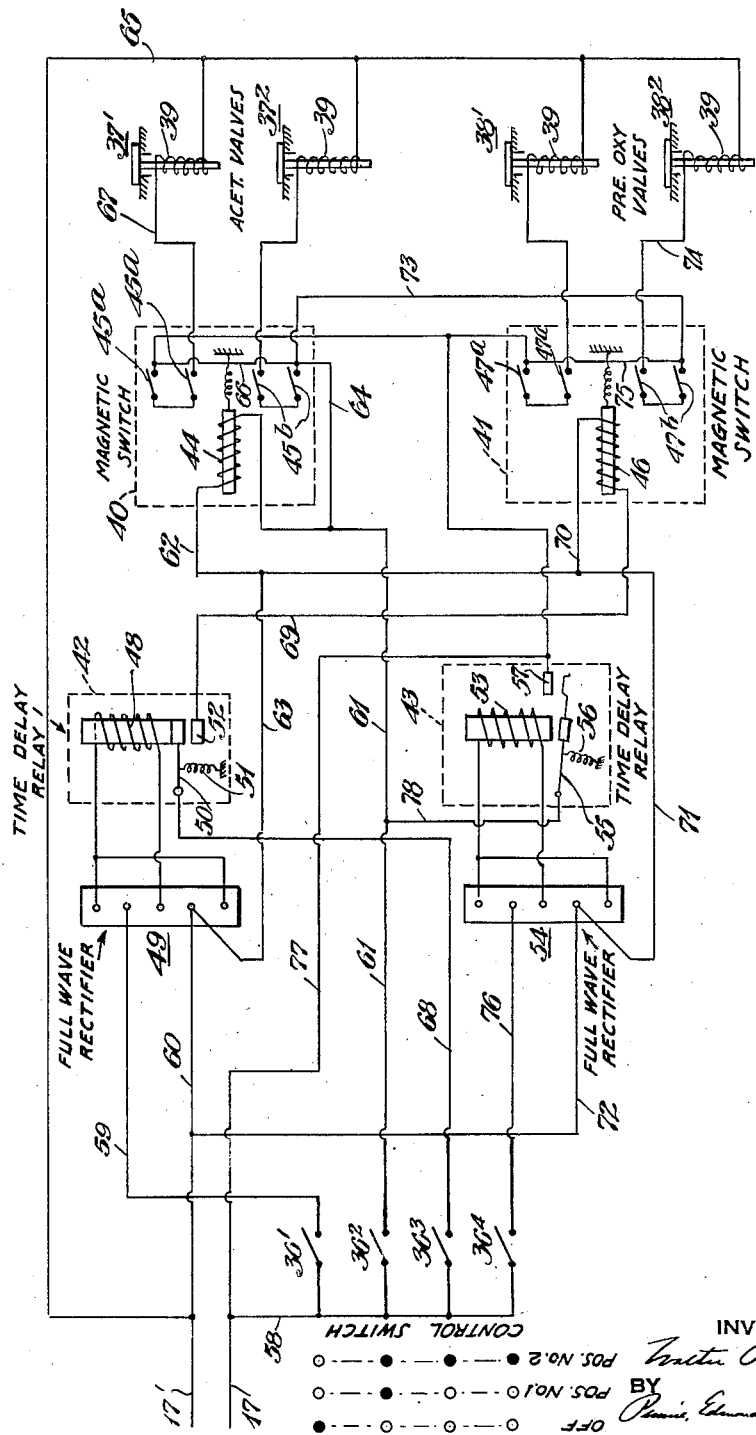
Fig. 3 is a circuit diagram showing diagrammatically the instrumentalities used in the part of the system which controls the valves for the preheating gases, and showing the circuits for such instrumentalities.

Referring first to Fig. 1, a work-piece to be scarfed, such as a billet, is represented at W. It is supported on a number of power-driven feed rolls 1 such as the feed rolls of a mill table. The feed rolls are driven from an electric motor 2 through reduction gearing 3 and through a common drive shaft 4 geared to the feed rolls. The feed rolls move the work-piece past scarfing torches, the tips of which are represented at 5. There may be one tip for each face of the billet or two tips each of which is adapted to scarf two contiguous billet faces, and in either of such cases all four faces of the billet will be scarfed simultaneously, or there may be a single tip for scarfing only one face of the billet. In Fig. 1 two tips are shown for scarfing the top and bottom faces of the work-piece. Each torch tip when designed to scarf one billet face only may be of the type shown in Fig. 2, comprising an elongated block 6 having a row of scarfing oxygen passages in it which terminate in a row of discharge orifices 7 in the discharge face 8 of the tip whereby jets of scarfing oxygen are projected onto the surface of the work-piece in a row extending transversely of the work-piece. Scarfing oxygen is supplied to each torch tip through an inlet pipe represented at 9. The torch tip also has a number of gas passages for the combustible gas mixture terminating in discharge orifices 10 in the discharge face of the tip. The gas mixture issuing from the discharge orifices 10 feeds the preheating flames that are directed against the surface of the work-piece to raise the metal to kindling temperature in a manner well understood in the art. The preheating gases which makes up the combustible gas mixture, such as acetylene and preheating oxygen, are delivered to a mixer 11 by pipes 12 and 13, respectively, and the gas mixture passes from the mixer into the torch tip.

The control station is represented at 14. At the control station there is a single pole double-throw electric switch 15 which is adapted to be manually actuated by means of a handle diagrammatically shown at 16. When the switch 15 is moved from the position shown in Fig. 1 to its other position a circuit is completed to the motor 2 as follows: From one conductor 17 of an alternating current power line, arm 18 of the control switch, contact 19 of the switch, conductor 20, motor 2, and conductor 21 to the other conductor 17' of the power line.

When the switch 15 is in the position shown in Fig. 1 the switch arm 18 engages a second contact 22 to complete a circuit to a rectifier 23, such as a copper oxide rectifier, as follows: From the conductor 17 of the power line switch arm 18, contact 22, conductor 24, rectifier 23, and conductor 25 to the conductor 17' of the power line. The rectifier supplies direct current to the coil 26 of a time delay relay 27. When the coil 26 is energized it attracts an armature 28 which is normally biased to close position by a spring 29. When the armature 28 is released it engages a contact 30 which is connected by means of a conductor 31 to the conductor 17 of the power line. It then completes a circuit to the solenoid valves that control the supply of scarfing oxygen to the torch tips. Two scarfing oxygen valves are shown in Fig. 1 at 32¹ and 32², one for each of the torch tips. The scarfing oxygen valves are actuated by solenoids 33¹ and 33², respectively. The coils of the solenoids are connected in parallel across the relay armature 28 and a conductor 34 leading to the conductor 17' of the power line. The relay armature when in engagement with the contact 30 completes the circuit to the solenoids of the scarfing oxygen valves as follows: From the conductor 17 of the power line, conductor 31, contact 30, armature 28, parallel conductors 34¹ and 34² and the coils of valve-solenoids 33¹ and 33², and conductor 34 to the conductor 17' of the power line.

Thus it will be seen that when the motor control switch 15 is in the position shown in Fig. 1, i. e. the position in which the motor 2 is not energized, the circuit to the rectifier is completed and the coil of the time delay relay 27 is energized to attract the armature 28 and thereby break the circuit in which the solenoids of the scarfing oxygen valves are connected. The scarfing oxygen is therefore turned off when the motor 2 is not running. When the motor control switch is actuated to start the motor 2 it breaks the circuit to the rectifier, thereby permitting the time delay relay to release its armature 28 and complete the circuit to the solenoids of the scarfing oxygen valves, but the relay 27 is of the type in which the flux decays slowly and therefore the armature 28 will not be released immediately upon deenergization of relay coil 26. When the relay magnetism becomes insufficient to hold the armature 28 any longer against the tension of the spring 29, the armature will move to the position in which it engages the contact 30 to thereby complete the circuit to the solenoids of the scarfing oxygen valves. The delay in the movement of the armature 28 to close position delays the turning on of the scarfing oxygen a sufficient length of time after the motor 2 is energized to permit the feed rolls 1 to overcome the inertia of the work-piece and start it in motion. The length of time required for the flux of the relay 27 to decay to a value that is insufficient to overcome the spring 29 is the interval of time delay caused by the relay. The opening of each scarfing oxygen valve causes scarfing oxygen to be delivered to the corresponding torch tip through the inlet pipe 9 above described.

The time required for the scarfing oxygen valves to open, and the time required for the scarfing oxygen to flow from the valves through the piping and hose lines must be taken into consideration in determining how much delay there should be in the movement of the armature 28 of the time delay relay 27 to closed position. Experience has shown that with some scarfing apparatus about three seconds is sufficient time between the closing of the motor circuit and the inauguration of the gas flow from the scarfing orifices of the torch tips. However, this time interval is given by way of illustration only because in practice it depends among other things upon the mass of the work and the number of power-driven rolls of the mill table by which the work-piece is supported.

Before the actual scarfing of the work-piece is started the surface metal must be brought to kindling temperature by means of the preheating flames at the discharge orifices 10 of the torch tips. Therefore, the first operation is to bring the work-piece into a position in which the preheating flames will be directed against the surface metal at the forward end of the work-piece, allowing the work-piece to remain in this position a sufficient interval of time to bring the surface metal to kindling temperature before the motor control switch is actuated to start the motor 2 and to turn on the scarfing oxygen. As above stated, it is desirable that the fuel-gas used for preheating be turned on in advance of the preheating oxygen to prevent a flashback from occurring. This is accomplished by actuating another switch at the control station 14, the handle of this switch being diagrammatically represented at 36 in Fig. 1.

Referring now to Fig. 3, the switch actuated by the handle 36 has four pairs of contacts $36^1$, $36^2$, $36^3$ and $36^4$. The switch is a three-position switch and is movable successively from an "off" position through position No. 1 to position No. 2. As shown by the chart alongside of the switch contacts in Fig. 3, in the "off" position of the switch the first pair of contacts $36^1$ are closed and the other contacts are open. In position No. 1 the second pair of contacts $36^2$ are closed and all of the other contacts are open. In position No. 2 the first pair of contacts are open and the other three pairs of contacts $36^2$, $36^3$ and $36^4$ are all closed.

In Fig. 3 the valves which control the supply of fuel-gas, such as acetylene, to the scarfing torches are diagrammatically represented at $37^1$ and $37^2$. There is one valve for each torch tip, so two acetylene valves are represented in Fig. 3 because there are two torch tips shown in Fig. 1. The preheating oxygen valves are diagrammatically represented in Fig. 3 at $38^1$ and $38^2$. As in the case of the acetylene valves there is one preheating oxygen valve for each torch tip. The acetylene and preheating oxygen valves are of the solenoid-operated type, the solenoid coil for each valve being represented at 39.

The control system by which the acetylene and preheating oxygen valves are controlled by the opening and closing of the switch contacts $36^1$, $36^2$, $36^3$ and $36^4$ includes, in addition to the conductors hereinafter described, the following instrumentalities: An electro-magnetic switch 40, preferably of the solenoid-operated type, for the acetylene valves, a similar switch 41 for the preheating oxygen valves, and time delay relays 42 and 43, respectively, the function of which will hereinafter appear. When the coil 44 of the magnetic switch 40 is energized the contacts $45^a$ and $45^b$ of the switch are closed to energize the solenoid coils of the acetylene valves, and when the coil 46 of the magnetic switch 41 is energized the switch contacts $47^a$ and $47^b$ are closed to energize the solenoid coils of the preheating oxygen valves, all as hereinafter described. The time delay relay 42 has a coil 48 adapted to be energized by direct current from a rectifier 49, such as a copper oxide rectifier. The armature 50 of the relay is normally biased to close position by a spring 51. When in close position it engages a contact 52 to complete a circuit to be hereinafter described. The coil 53 of the time delay relay 43 is adapted to be energized by direct current from a second rectifier 54. The relay has an armature 55 biased to open position by a spring 56. When the armature 55 is in its attracted position it engages a contact 57 to complete a circuit as later described.

In the "off" position of the control switch (in which contacts $36^1$ only are closed), a circuit is completed to the rectifier 49 as follows: From the conductor 17 of the power line, conductor 58, closed contacts $36^1$, conductor 59, rectifier 49, and conductor 60 to the conductor 17' of the power line. Direct current is then supplied by the rectifier to the coil 48 of the time delay relay 42. Hence, in the "off" position of the control switch the armature 50 of the time delay relay 42 is attracted and is out of engagement with contact 52. When the control switch is moved to position No. 1 (in which the contacts $36^2$ only are closed) a circuit is completed to the coil 44 of the magnetic switch 40 as follows: From the conductor 17 of the power line, conductor 58, closed contacts $36^2$, conductor 61, coil 44 of the magnetic switch, conductor 62, conductor 63, and conductor 60 to the conductor 17' of the power line. Energization of the coil 44 closes all of the contacts of the magnetic switch 40 and completes circuits through the solenoid coils 39 of the acetylene valves $37^1$ and $37^2$ as follows: From the conductor 17 of power line, conductor 58, closed contacts $36^2$, conductor 61, conductor 64, switch contacts $45^b$, solenoid coil 39, and common return conductor 65 to the conductor 17' of the power line. A conductor 66 connects the switch contacts $45^a$ in parallel with the switch contacts $45^b$, so that when the contacts are closed, current also passes from the conductor 64 through the conductor 66, switch contacts $45^a$ and conductor 67 to the solenoid coil of the other acetylene valve $37^1$, and back to the conductor 17' of the power line through the return conductor 65. Thus, when the control switch is moved to position No. 1 the two acetylene valves will be open. Since the contacts $36^1$ of the control switch are open in position No. 1 of the control switch the coil 48 of the time delay relay 42 is deenergized and the armature 50 moves into engagement with the contact 52 but with a delayed action for the purpose later described. When the control switch is moved to position No. 2 (in which contacts $36^2$, $36^3$, and $36^4$ are closed) the acetylene valves will remain open since the solenoid coils 39 of the acetylene valves $37^1$ and $37^2$ continue to be energized inasmuch as the control switch contacts $36^2$ are closed. Since contacts $36^3$ of the control switch are also closed a circuit is completed to the coil 46 of the magnetic switch 41 that energizes the solenoid coils of the preheating oxygen valves as follows: From the conductor 17 of the power line, conductor 58, closed contacts $36^3$, conductor 68, armature 50 of time delay relay 42, contact 52, conductor 69, coil 46 of the magnetic switch 41, conductor 70, and conductors 71 and 72 to the conductor 17' of the power line. Closing of the contacts $47^a$ of the magnetic switch 41 completes a circuit through the solenoid coil 39 of the preheating oxygen valve $38^1$ as follows: From the conductor 17 of the power line, conductor 58, closed contacts $36^2$ of the control switch, conductor 61, conductor 64, conductor 73, closed contacts $47^b$ of the magnetic switch 41, conductor 74, solenoid coil 39 of the preheating oxygen valve $38^2$, and common return conductor 65 to the conductor 17' of the power line. A conductor 75 connects the contacts $47^a$ and $47^b$ of the magnetic switch 41 in parallel so that current is also supplied from the conductors 73 through the conductor 75 and switch contacts $47^a$ to the solenoid coil 39 of the other preheating oxygen valve $38^1$. Thus, in position No. 2 of the control switch the magnetic switch 41 energizes the solenoid coils of the preheating oxygen valves and causes these valves to open. However, the coil of the magnetic switch 41 cannot be energized until the time delay relay 42 releases its armature 50 so that it engages contact 52. The time delay relay 42 functions like the time delay relay 27 described in connection with Fig. 1. That is, there is an interval of time after which the coil 48 of the time delay relay is deenergized (when the control switch is moved from "off" position to position No. 1) before the armature 50 is released to engage the contact 52. Therefore, should the control switch be moved too rapidly through position No. 1 to position No. 2 so that the preheating oxygen would normally be turned on too soon after the acetylene, the delay in the release of the armature 50 of the time delay relay 42 will delay the completion of the circuit in which the coil 46 of the magnetic switch 41 is connected, thereby delaying the opening of the preheating oxygen valves. The delay is sufficient to permit the acetylene to start flowing and be ignited and attain a velocity such that when the preheating oxygen is turned on a flashback is not likely to occur. The length of time required for the flux to decay in the time delay relay 42 and thereby release its armature 50 is the time delay obtained from this relay.

Since contacts 36⁴ of the control switch are closed in position No. 2 of the control switch a circuit is completed to the rectifier 54 as follows: From the conductor 17 of the power line, conductor 58, contacts 36⁴, conductor 76, rectifier 54, and conductor 72 to the conductor 17' of the power line. The direct current delivered by the rectifier energizes the coil 53 of the time delay relay 43 causing the armature 55 of this relay to be attracted and engage the contact 57. This connects the coil of the magnetic switch 40 for the acetylene valves directly across the line, the circuit being from the conductor 17 of the power line, conductor 77, contact 57 of the time delay relay 43, armature 55, conductor 78, conductor 61, coil 44 of the magnetic switch 40, and conductors 62, 63 and 60 to the conductor 17' of the power line. Therefore, in turning off the preheating gases, should the control switch be reversely operated too quickly from position No. 2 through position No. 1, the time delay relay 43 will keep the magnetic switch 40 in closed position, and thereby keep the acetylene valves open after closing of the preheating oxygen valves until the flux in the time delay relay decays sufficiently to allow the spring 56 to move the relay armature to open position. This delay in the operation of the magnetic switch 40 allows sufficient time in the closing of the acetylene valves to avoid the danger of a flashback such as might occur during the decrease in velocity of the preheating gases if both of them were turned off simultaneously.

It will now be seen that operation of the control switch for the preheating gas valves through its successive positions first causes the acetylene valves to open and then the preheating oxygen valves to open. Even if the control switch is operated too quickly, the opening of the preheating oxygen valves will be delayed a sufficient time after the acetylene valves are open to avoid the danger of a flashback. Similarly, when the control switch is reversely operated to turn off the supply of preheating gases to the torch tips the preheating oxygen valves are first closed and then the acetylene valves are closed, and even if the control switch is operated too rapidly the closing of the acetylene valves will be delayed long enough after the closing of the preheating oxygen valves to avoid the danger of a flashback.

The operation of the complete valve control system, briefly stated, is as follows:

A work-piece is moved to preheating position in which its forward end is in proper relation to the torch tips for the preheating flames to heat the surface metal to kindling temperature. The control switch for the preheating gas valves is then turned through its successive positions by means of the handle 36 (Fig. 1) to turn on the acetylene, and after the danger of a flashback is over, to turn on the preheating oxygen. When the surface metal of the work-piece reaches kindling temperature the motor switch 15 is actuated by operating the handle 16 and this first energizes the motor 2 and then turns on the scarfing oxygen after a delay which allows sufficient time for the work-piece to start moving before the scarfing oxygen issues from the torch tips. After the work-piece is scarfed the handles of the control switches are operated in the reverse direction to stop the motor 2 and turn off the supply of scarfing oxygen and to first turn off the preheating oxygen, and then after danger of a flashback is over, to turn off the acetylene.

I claim:

1. In a machine for scarfing billets and the like having at least one scarfing torch with a tip adapted to direct scarfing oxygen against a surface of the billet and further having an electric motor and means operated thereby for producing relative movement between the billet and the torch tip, a valve for controlling the supply of scarfing oxygen to the torch tip, electro-magnetic actuating means for the valve, a control switch for said motor, electric circuits adapted in the closed position of the motor control switch to cause energization of said valve actuating means to open the scarfing oxygen valve, and a time delay device electrically connected in one of said circuits for delaying energization of the valve actuating means and opening of the scarfing oxygen valve for a predetermined interval after energization of said motor by the closing of said control switch.

2. In a machine for scarfing billets and the like having at least one scarfing torch with a tip adapted to direct scarfing oxygen against a surface of the billet and further having an electric motor and means operated thereby for moving the billet past the torch tip, a valve for controlling the supply of scarfing oxygen to the torch tip, electro-magnetic actuating means for the valve, a control switch for said motor, and electric circuits adapted in the closed position of the motor control switch to cause energization of said valve actuating means to open the scarfing oxygen valve, said circuits including a time delay relay for delaying energization of the valve actuating means and opening of the scarfing oxygen valve for a predetermined interval after energization of said motor by the closing of said control switch.

3. In a machine for scarfing billets and the like having at least one scarfing torch with a tip adapted to direct preheating flames and scarfing oxygen against the surface of a billet and further having an electric motor and means operated thereby for producing relative movement between the billet and the torch tip, a valve control system comprising two control switches located at a control station one of said switches being a motor control switch for said motor and the other being a control switch for the preheating gases, a valve for controlling the supply of scarfing oxygen to the torch tip, electro-magnetic actuating means for the valve, electric circuits adapted in the closed position of said motor control switch to cause energization of said valve actuating means to open the scarfing oxygen valve, said circuits including means for delaying energization of the valve actuating means and opening of the scarfing oxygen valve for a predetermined interval after energization of said motor by the closing of said motor control switch, a valve for controlling the supply of preheating fuel-gas to the torch tip, a valve for controlling the supply of preheating oxygen to the torch tip, each of said valves having electro-magnetic actuating means, said control switch for the preheating gas valves comprising a plurality of pairs of contacts and common manually operable means for opening and closing the contacts and adapted in successive positions to close one pair of said contacts and then close an additional pair thereof, circuit connections including said one pair of contacts adapted when such contacts are closed to energize the actuating means of the preheating fuel-gas valve and thereby open such valve, and circuit connections including said additional pair of contacts for energizing the actuating means of the preheating oxygen valve to thereby open such valve, said last-named circuit connections including means for delaying energization of the actuating means of the preheating oxygen valve for a predetermined interval after energization of the actuating means of the preheating fuel-gas valve in case said control switch for the preheating gas valves is operated rapidly through the position which opens the fuel-gas valve.

4. In a machine for scarfing billets and the like having at least one scarfing torch with a tip adapted to direct preheating flames and scarfing oxygen against the surface of a billet and further having an electric motor and means operated thereby for producing relative movement between the billet and the torch tip, a valve control system comprising two control switches located at a control station one of said switches being a motor control switch for said motor and the other being a control switch for the preheating gases, a valve for controlling the supply of scarfing oxygen to the torch tip, electro-magnetic actuating means for the valve, electric circuits adapted in the closed position of said motor control switch to cause energization of said valve actuating means to open the scarfing oxygen valve, said circuits including a time delay relay for delaying energization of the valve actuating means and opening of the scarfing oxygen valve for a predetermined interval after energization of said motor by the closing of said motor control switch, a valve for controlling the supply of preheating fuel-gas to the torch tip, a valve for controlling the supply of preheating oxygen to the torch tip, each of said valves having electro-magnetic actuating means, said control switch for the preheating gas valves comprising a plurality of pairs of contacts and common manually operable means for opening and closing the contacts and adapted in successive positions to close one pair of said contacts and then close an additional pair thereof, circuit connections including said one pair of contacts adapted when such contacts are closed to energize the actuating means of the preheating fuel-gas valve and thereby open such valve, and circuit connections including said additional pair of contacts for energizing the actuating means of the preheating oxygen valve to thereby open such valve, said last-named circuit connections including a time delay relay for delaying energization of the actuating means of the preheating oxygen valve for a predetermined interval after energization of the actuating means of the preheating fuel-gas valve in case said control switch for the preheating gas valves is operated rapidly through the position which opens the fuel-gas valve.

5. In a machine for scarfing billets and the like having at least one scarfing torch with a tip adapted to direct preheating flames and scarfing oxygen against a surface of a billet and further having an electric motor and means operated thereby for producing relative movement between the billet and the torch tip, a valve control system comprising two control switches located at a control station, one of said switches being a motor control switch for said motor having a pair of contacts and the other being a control switch for the preheating gases, a valve for controlling the supply of scarfing oxygen to the torch tip, electro-magnetic actuating means for such valve, electric circuits including the contacts of said motor control switch adapted upon operation of the motor control switch to energize said motor and after a predetermined delay to energize the electro-magnetic actuating means of the scarfing oxygen valve and thereby open such valve, a valve for controlling the supply of preheating fuel-gas to the torch tip, a valve for controlling the supply of preheating oxygen to the torch tip, each of said last-named valves having electro-magnetic actuating means, said control switch for the preheating gases having a plurality of pairs of contacts, and circuit connections including the contacts of the preheating gas control switch and the electro-magnetic actuating means of the preheating gas valves adapted upon operation of the preheating gas control switch in one direction to energize the actuating means of the fuel-gas valve and thereby open such valve and after a predetermined delay to energize the actuating means of the preheating oxygen valve and thereby open such valve.

WALTER BEGEROW.

REFERENCES CITED

The following references are of record in the file of this patent:

UNITED STATES PATENTS

| Number | Name | Date |
|---|---|---|
| 2,177,276 | Bucknam | Oct. 24, 1939 |
| 2,244,822 | Bucknam | June 10, 1941 |
| 2,277,054 | Anderson | Mar. 24, 1942 |
| 2,290,271 | Bucknam | July 21, 1942 |
| 2,290,283 | Jones | July 21, 1942 |
| 2,290,626 | Bosomworth | July 21, 1942 |
| 2,293,802 | Carlson et al. | Aug. 25, 1942 |
| 2,424,270 | Ehemann, Jr., et al. | July 22, 1947 |
| 2,448,657 | Bucknam | Sept. 7, 1948 |

OTHER REFERENCES

The Oxy-Acetylene Handbook; pages 85, 89; copyright 1943, pub. by The Linde Air Products Co., New York.